US012718541B2

(12) United States Patent
Okada et al.

(10) Patent No.: US 12,718,541 B2
(45) Date of Patent: Aug. 25, 2026

(54) INFORMATION PROCESSING METHOD, INFORMATION PROCESSING DEVICE, AND NON-TRANSITORY COMPUTER READABLE RECORDING MEDIUM

(71) Applicant: Panasonic Intellectual Property Corporation of America, Torrance, CA (US)

(72) Inventors: Shintaro Okada, Fukuoka (JP); Masanari Miyamoto, Fukuoka (JP); Kousuke Itakura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 294 days.

(21) Appl. No.: 18/644,689

(22) Filed: Apr. 24, 2024

(65) Prior Publication Data

US 2024/0273883 A1 Aug. 15, 2024

Related U.S. Application Data

(63) Continuation of application No. PCT/JP2022/035967, filed on Sep. 27, 2022.

(Continued)

(30) Foreign Application Priority Data

Apr. 5, 2022 (JP) ................................ 2022-063089

(51) Int. Cl.
*G06K 9/00* (2022.01)
*G06V 10/74* (2022.01)
(Continued)

(52) U.S. Cl.
CPC .......... *G06V 10/803* (2022.01); *G06V 10/761* (2022.01); *G06V 40/168* (2022.01);
(Continued)

(58) Field of Classification Search
CPC .. G06V 10/803; G06V 10/761; G06V 40/168; G06V 40/172; G06V 10/74; G06T 7/00; G10L 17/00
See application file for complete search history.

(56) References Cited

U.S. PATENT DOCUMENTS 4,449,189 A * 5/1984 Feix ...................... G06V 40/20 382/118
6,341,263 B1 * 1/2002 Yamada ................. G10L 17/00 704/239
(Continued)

FOREIGN PATENT DOCUMENTS

CN 101075868 A * 11/2007
CN 102045162 A * 5/2011
(Continued)

OTHER PUBLICATIONS

Advances in Speaker Recognition for Telephone and Audio-Visual Data: the JHU-MIT Submission for NIST SRE19, Jes'us Villalba et al., Odyssey, 2020, pp. 273-280 (Year: 2020).*
(Continued)

*Primary Examiner* — Jayesh A Patel
(74) *Attorney, Agent, or Firm* — Greenblum & Bernstein, P.L.C.

(57) ABSTRACT

An information processing device performs: acquiring a face similarity indicating a similarity between a face of a first person and a face of a second person; acquiring a voice similarity indicating a similarity between a voice of the first person and a voice of the second person; calculating an integrated similarity by integrating the face similarity and the voice similarity, and determining the integrated similarity as a final similarity when the face similarity falls within an integrated range including a threshold which is used to determine whether the first person and the second person are identical to each other, and calculating the face similarity as
(Continued)

100:INFORMATION PROCESSING SYSTEM
1 INFORMATION PROCESSING DEVICE
11 PROCESSOR
2 CAMERA
111 FACE FEATURE AMOUNT CALCULATION PART
112 FACE SIMILARITY CALCULATION PART
113 FIRST ACQUISITION PART
117 INTEGRATING PART
118 RECOGNITION PART
119 OUTPUT PART
3 MICROPHONE
114 VOICE FEATURE AMOUNT CALCULATION PART
115 VOICE SIMILARITY CALCULATION PART
116 SECOND ACQUISITION PART
12 MEMORY
4 DISPLAY a final similarity when the face similarity is out of the integrated range; and outputting the final similarity.

14 Claims, 12 Drawing Sheets

Related U.S. Application Data

(60) Provisional application No. 63/274,200, filed on Nov. 1, 2021.

(51) Int. Cl.
*G06V 10/80* (2022.01)
*G06V 40/16* (2022.01)
*G10L 17/02* (2013.01)
*G10L 17/10* (2013.01)

(52) U.S. Cl.
CPC ............ *G06V 40/172* (2022.01); *G10L 17/02* (2013.01); *G10L 17/10* (2013.01)

(56) References Cited

U.S. PATENT DOCUMENTS 7,336,807 B2 * 2/2008 Tabata ................. G06V 40/161 382/103
7,929,733 B1 * 4/2011 Lehnert .................. G06V 20/30 382/209
10,178,301 B1 * 1/2019 Welbourne ........... G06V 40/172
2006/0115129 A1 * 6/2006 Abe ........................ G06F 18/21 382/115
2006/0228005 A1 * 10/2006 Matsugu ................ G06V 40/10 382/116
2007/0253603 A1 * 11/2007 Kimura .................. G06V 10/98 382/115
2009/0147995 A1 * 6/2009 Sawada ................ G06V 40/168 382/103
2009/0171660 A1 * 7/2009 Jian ......................... G10L 17/20 704/E17.001
2012/0230555 A1 * 9/2012 Miura .................. G06V 30/242 382/124
2013/0212655 A1 * 8/2013 Hoyos .................... G06V 40/45 726/5
2015/0234881 A1 * 8/2015 Hirata .................. G06V 10/772 707/609
2015/0248798 A1 * 9/2015 Howe .................. G08B 25/008 340/5.83
2015/0371098 A1 * 12/2015 Ishii ....................... G06V 40/70 382/115
2016/0292536 A1 * 10/2016 Irie ...................... G06V 40/172
2019/0215464 A1 * 7/2019 Kumar ..................... H04N 7/08
2020/0111496 A1 * 4/2020 Itakura .................... G10L 17/18
2020/0159899 A1 * 5/2020 Maeno .................... G06F 21/32
2023/0016655 A1 * 1/2023 Itakura .................... G10L 17/26
2023/0073265 A1 * 3/2023 Honda .................. G06F 16/435

FOREIGN PATENT DOCUMENTS

CN 103841108 A * 6/2014 ......... H04L 63/0884
CN 105512535 A * 4/2016 ............. G06Q 50/26
CN 107680221 A * 2/2018 ......... G07C 9/00904
CN 109428804 A * 3/2019 ............. H04L 51/23
CN 110222719 A * 9/2019 ............. G10L 17/02
CN 110717067 A * 1/2020 ............. G06F 16/65
EP 0582989 A2 * 2/1994 ........... G06V 10/811
EP 1239405 A2 * 9/2002 ........... G06V 10/772
JP H10261083 A * 9/1998
JP 10-320552 12/1998
JP H11282492 A * 10/1999
JP 11-306351 11/1999
JP 2003-058888 2/2003
JP 2006-078855 3/2006
JP 2008048001 A * 2/2008
JP 2008-257327 10/2008
JP 2011-044101 3/2011
JP 2016-189162 11/2016
KR 2015042674 A * 4/2015
KR 20160098581 A * 8/2016 ............. G10L 17/10
WO 2011/061862 5/2011
WO WO-2017181609 A1 * 10/2017 ........... G06F 3/0484
WO WO-2018157840 A1 * 9/2018 ............. G10L 25/51
WO WO-2020077885 A1 * 4/2020 ............. G06F 21/32
WO WO-2020206906 A1 * 10/2020 ............. H04L 67/55

OTHER PUBLICATIONS

Robust Biometric Person Identification Using Automatic Classifier Fusion of Speech, Mouth, and Face Experts, Niall A. Fox et al., IEEE, 2007, pp. 701-714 (Year: 2007).*
Person Identification Using Automatic Integration of Speech, Lip, and Face Experts, Niall A. Fox et al., ACM, 2003, pp. 25-31 (Year: 2003).*
Matching Voice and Face Identity From Static Images, Lauren W. Mavica et al., 2013, pp. 307-312 (Year: 2013).*
Integrating face and voice in person perception, Salvatore Campanella et al., Elsevier, 2007, pp. 535-543 (Year: 2007).*
Villalba et al., "Advances in Speaker Recognition for Telephone and Audio-Visual Data: the JHU-MIT Submission for NIST SRE19", Odyssey 2020 the Speaker and Language Recognition Workshop, Nov. 1-5, 2020, pp. 273-280.
International Search Report issued in International Pat. Appl. No. PCT/JP2022/035967, dated Dec. 13, 2022, along with an English translation thereof.

* cited by examiner

100:INFORMATION PROCESSING SYSTEM
INFORMATION PROCESSING DEVICE
1
11
PROCESSOR
111
FACE FEATURE AMOUNT CALCULATION PART
112
FACE SIMILARITY CALCULATION PART
113
FIRST ACQUISITION PART
114
VOICE FEATURE AMOUNT CALCULATION PART
115
VOICE SIMILARITY CALCULATION PART
116
SECOND ACQUISITION PART
117
INTEGRATING PART
118
RECOGNITION PART
119
OUTPUT PART
12
MEMORY
2
CAMERA
3
MICROPHONE
4
DISPLAY

FIG.6

| | EER(%) | minC |
|---|---|---|
| COMPARATIVE EXAMPLE | 0.406 | 0.021 |
| FIRST EMBODIMENT | 0.381 | 0.012 |

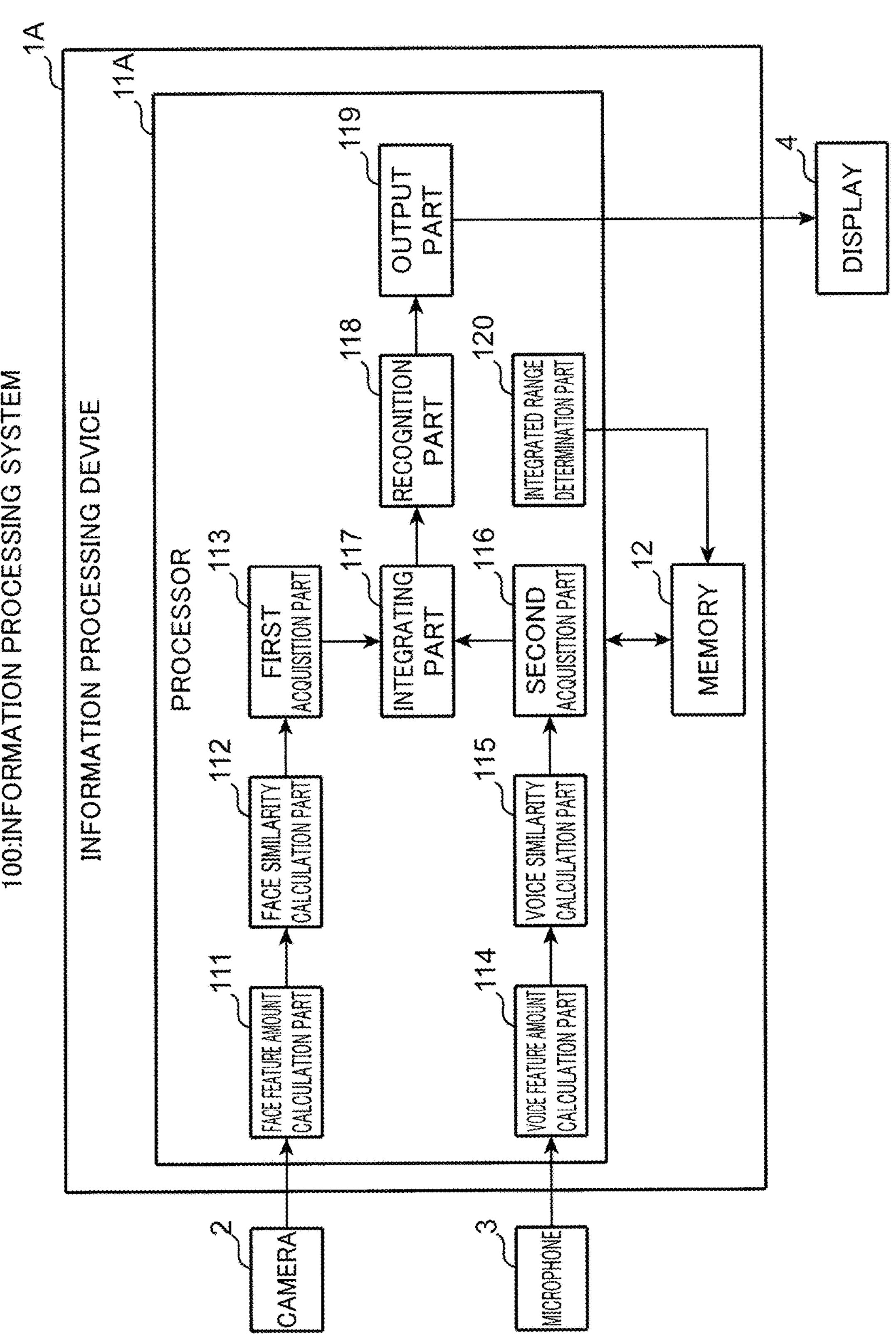
FIG.7
100:INFORMATION PROCESSING SYSTEM
1A
11A
INFORMATION PROCESSING DEVICE
PROCESSOR
111
FACE FEATURE AMOUNT CALCULATION PART
112
FACE SIMILARITY CALCULATION PART
113
FIRST ACQUISITION PART
114
VOICE FEATURE AMOUNT CALCULATION PART
115
VOICE SIMILARITY CALCULATION PART
116
SECOND ACQUISITION PART
117
INTEGRATING PART
118
RECOGNITION PART
119
OUTPUT PART
120
INTEGRATED RANGE DETERMINATION PART
12
MEMORY
2
CAMERA
3
MICROPHONE
4
DISPLAY

INFORMATION PROCESSING METHOD, INFORMATION PROCESSING DEVICE, AND NON-TRANSITORY COMPUTER READABLE RECORDING MEDIUM

FIELD OF INVENTION

The present disclosure relates to a technology of recognizing a target person.

BACKGROUND ART

Non-patent Literature 1 discloses a technology of recognizing a target person by comparing a face image of a registered person and a face image of a target person with each other and comparing voice data of the registered person and voice data of the target person with each other.

However, Non-patent Literature 1 fails to consider a decrease in a recognition accuracy influenced by a comparison result of the face images and a comparison result of voice data in a case where the comparison result of the face images shows a high accuracy while the comparison result of the voice data rather shows a low accuracy, and thus needs further improvement.

Non-patent Literature 1: Jesus Villalba, Daniel Garcia-Romero, Nanxin Chen, Gregory Sell, Jonas Borgstrom, Alan McCree, L. Paola Garcia-Perera 1, Saurabh Kataria, Phani Sankar Nidadavolu, Pedro A. Torres-Carrasquillo, Najim Dehak, "Advances in Speaker Recognition for Telephone and Audio-Visual Data: the JHU-MIT Submission for NIST SRE 19", Odyssey 2020 The Speaker and Language Recognition Workshop 1-5 November 2020, Tokyo, Japan

SUMMARY OF THE INVENTION

This disclosure has been achieved to solve the drawback described above, and has an object of providing a technology of recognizing a target person with a high accuracy regardless of an accuracy of voice data in recognizing the target person by using the voice data and a face image.

An information processing method according to one aspect of the present disclosure is an information processing method by a computer. The method includes: acquiring a face similarity indicating a similarity between a face of a first person and a face of a second person; acquiring a voice similarity indicating a similarity between a voice of the first person and a voice of the second person; calculating an integrated similarity by integrating the face similarity and the voice similarity, and determining the integrated similarity as a final similarity when the face similarity falls within an integrated range including a threshold which is used to determine whether the first person and the second person are identical to each other, and calculating the face similarity as a final similarity when the face similarity is out of the integrated range; and outputting the final similarity.

This disclosure achieves recognition of a target person with a high accuracy regardless of an accuracy of voice data in recognizing the target person using the voice data and a face image.

BRIEF DESCRIPTION OF THE DRAWINGS

FIG. 6 is a table showing experimental results of the information processing device in the first embodiment and the comparative example.

FIG. 7 is a diagram showing an example of an overall configuration of an information processing system in a second embodiment of the disclosure.

DETAILED DESCRIPTION

Figure 1:
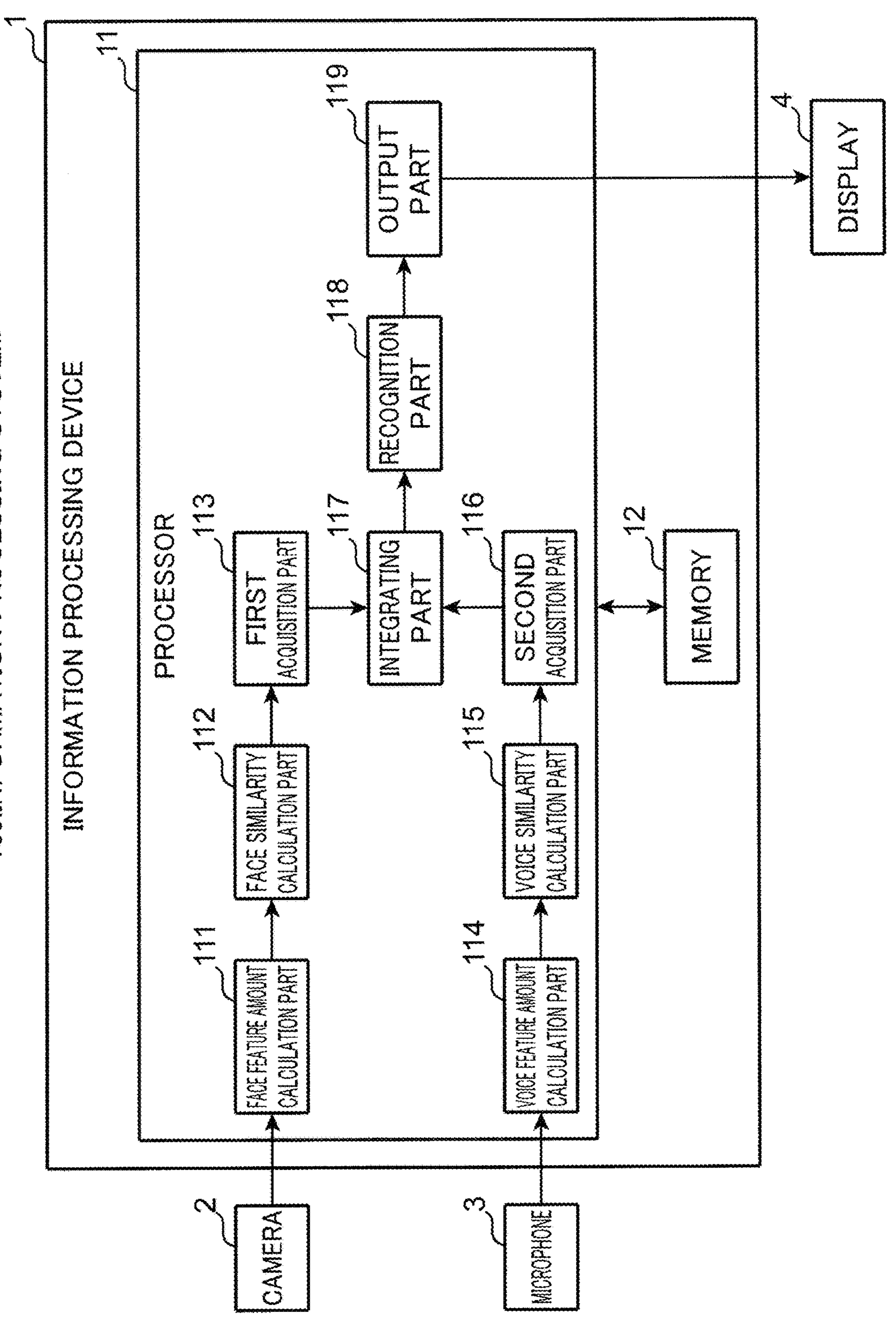
FIG. 1 is a block diagram showing an example of an overall configuration of an information processing system in a first embodiment of the disclosure.

Knowledge forming the basis of the present disclosure

In recent years, a multi modality recognition technology for recognizing a target person by using a face image in addition to voice data has been studied to further improve a recognition accuracy of the target person (e.g., Non-patent Literature 1). The multi modality recognition technology includes calculating an integrated similarity by integrating a voice similarity indicating a similarity between voice data of a target person and voice data of a registered person and a face similarity indicating a similarity between a face image of the target person and a face image of the registered person, comparing the calculated integrated similarity with a threshold, and determining whether the target person and the registered person are identical to each other.

However, in a case where the acquired voice data of the target person has a low accuracy due to an influence of a noise or other factor while the acquired face image of the target person has a high accuracy, the voice similarity having a lower value affects the face similarity having a higher value and the integrated similarity falls below the threshold, which may result in erroneous determination that the target person is unidentical to the registered person. Hence, use of the voice similarity in addition to the face similarity in such a case may rather cause a drawback of a decrease in the recognition accuracy of the target person.

This disclosure has been achieved to solve the drawback described above.

(1) An information processing method according to one aspect of this disclosure is an information processing method by a computer. The method includes: acquiring a face similarity indicating a similarity between a face of a first person and a face of a second person; acquiring a voice similarity indicating a similarity between a voice of the first person and a voice of the second person; calculating an integrated similarity by integrating the face similarity and the voice similarity, and determining the integrated similarity as a final similarity when the face similarity falls within an integrated range including a threshold which is used to determine whether the first person and the second person are identical to each other, and calculating the face similarity as a final similarity when the face similarity is out of the integrated range; and outputting the final similarity.

In this configuration, when the face similarity falls within the integrated range including the threshold which is used to determine whether the first person and the second person are identical to each other, the integrated similarity is calculated by integrating the face similarity and the voice similarity, and the integrated similarity is determined as a final similarity. By contrast, when the face similarity is out of the integrated range, the face similarity is determined as a final similarity. In this way, the configuration enables recognition of a target person by using an integrated similarity integrating a face similarity and a voice similarity when the face similarity is around a threshold and it is difficult to make a determination only with the face similarity. By contrast, use of only the face similarity leads to a success in recognizing the target person when the face similarity is not around the threshold and the determination only with the face similarity is easy. This results in attaining recognition of the target person with a high accuracy regardless of an accuracy of voice data.

(2) The information processing method according to (1) may further include acquiring distribution information including a first distribution indicating a relation between a face similarity and a frequency of the face similarity about an identical person, and a second distribution indicating a relation between a face similarity and a frequency of the face similarity in a different person. The integrated range may be calculated on the basis of the first distribution and the second distribution.

This configuration in which the integrated range is calculated on the basis of the distribution information including the first distribution indicating the relation between the face similarity and the frequency of the face similarity about an identical person and the second distribution indicating the relation between the face similarity and the frequency of the face similarity in a different person enables accurate determination of the integrated range.

(3) In the information processing method according to (2), the integrated range may be determined on the basis of a width from a minimum in the face similarity in the first distribution to a maximum in the face similarity in the second distribution.

This configuration in which the integrated range is determined on the basis of the width from the minimum in the face similarity in the first distribution to the maximum in the face similarity in the second distribution enables accurate determination of the integrated range.

(4) In the information processing method according to (2) or (3), the integrated range may be determined on the basis of a first width from the threshold to a minimum in the face similarity in the first distribution and a second width from the threshold to a maximum in the face similarity in the second distribution.

This configuration in which the integrated range is determined on the basis of the first width from the threshold to the minimum in the face similarity in the first distribution and the second width from the threshold to the maximum in the face similarity in the second distribution enables accurate determination of the integrated range.

(5) In the information processing method according to any one of (2) to (4), the integrated range may have a width including the threshold at the center thereof. The width may be determined on the basis of a third width from a minimum in the face similarity to a maximum in the face similarity and an accuracy of the distribution information in the first distribution and the second distribution.

This configuration in which the integrated range has a width including the threshold at the center thereof and the width is determined on the basis of: the third width from the minimum in the face similarity to the maximum in the face similarity in a whole region of the first distribution and the second distribution; and an accuracy of the distribution information enables accurate determination of the integrated range.

(6) In the information processing method according to any one of (1) to (5), the integrated similarity may have a value obtained by performing weighted mean to the face similarity and the voice similarity by a predetermined weighting factor.

This configuration in which the integrated similarity has a value obtained by performing the weighted mean to the face similarity and the voice similarity by the predetermined weighting factor succeeds in appropriately integrating the face similarity and the voice similarity.

(7) In the information processing method according to (6), the predetermined weighting factor may have a fixed value.

This configuration in which the integrated similarity is calculated by using the fixed weighting factor attains facilitated calculation of the integrated similarity.

(8) In the information processing method according to (6), the predetermined weighting factor may have values that increase a ratio of the voice similarity to the face similarity as the face similarity comes closer to the center of the integrated range.

This configuration in which the integrated similarity is calculated by using the weighting factor having values that decrease as the face similarity comes closer to the center of the integrated range enables accurate calculation of the integrated similarity.

(9) In the information processing method according to any one of (1) to (8), the integrated similarity may be a sum of a value obtained by multiplying the voice similarity by a weighting factor and the face similarity.

This configuration in which the integrated similarity is calculated by adding the voice similarity having a value adjusted with the weighting factor to the face similarity enables accurate calculation of the integrated similarity on the basis of the face similarity.

(10) The information processing method according to any one of (1) to (9) may further include: acquiring a face image of the first person; calculating a face feature amount of the first person from the face image of the first person; acquiring a face feature amount of the second person; and calculating a face similarity from the face feature amount of the first person and the face feature amount of the second person. In the acquiring of the face similarity, the calculated face similarity may be adopted.

When the first person is defined as a target person and the second person is defined as a registered person, this configuration enables calculation as to whether the first person is identical to the registered person.

(11) The information processing method according to any one of (1) to (10) may further include: acquiring voice data of the first person; calculating a voice feature amount of the first person from the voice data of the first person; acquiring a feature amount of the second person; calculating a voice similarity from the voice feature amount of the first person and the voice feature amount of the second person. In the acquiring of the voice similarity, the calculated voice similarity may be adopted.

When the first person is defined as a target person and the second person is defined as a registered person, this configuration enables determination as to whether the first person is identical to the registered person.

(12) The information processing method according to any one of (1) to (11) may further include: determining that the first person and the second person are identical to each other when the final similarity exceeds the threshold, and determining that the first person and the second person are different from each other when the final similarity is smaller than the threshold; and outputting a result of the determination as to whether the first person and the second person are identical to each other or not.

This configuration enables determination as to whether the first person and the second person are identical to each other or not by using the final similarity.

(13) An information processing device according to another aspect of the present disclosure includes: a first acquisition part that acquires a face similarity indicating a similarity between a face of a first person and a face of a second person; a second acquisition part that acquires a voice similarity indicating a similarity between a voice of the first person and a voice of the second person, the voice similarity being calculated from a voice feature amount of the first person and a voice feature amount of the second person; an integrating part that calculates an integrated similarity by integrating the face similarity and the voice similarity, and determines the integrated similarity as a final similarity when the face similarity falls within an integrated range, and determines the face similarity as a final similarity when the face similarity is out of the integrated range; and an output part that outputs the final similarity.

This configuration can provide an information processing device that enables recognition of a target person with a high accuracy regardless of an accuracy of voice data.

(14) An information processing program according to another aspect of the disclosure causes a computer to execute: acquiring a face similarity indicating a similarity between a face of a first person and a face of a second person; acquiring a voice similarity indicating a similarity between a voice of the first person and a voice of the second person, the voice similarity being calculated from a voice feature amount of the first person and a voice feature amount of the second person; calculating an integrated similarity by integrating the face similarity and the voice similarity, and determining the integrated similarity as a final similarity when the face similarity falls within an integrated range, and calculating the face similarity as a final similarity when the face similarity is out of the integrated range; and outputting the final similarity.

This configuration can provide an information processing program for recognition of a target person with a high accuracy regardless of an accuracy of voice data.

This disclosure can be realized as an information processing system caused to operate by the information processing program as well. Additionally, it goes without saying that the computer program is distributable as a non-transitory computer readable storage medium like a CD-ROM, or distributable via a communication network like the Internet.

Each of the embodiments which will be described below represents a specific example of the disclosure. Numeric values, shapes, constituent elements, steps, and the order of the steps described below in each embodiment are mere examples, and thus should not be construed to delimit the disclosure. Moreover, constituent elements which are not recited in the independent claims each showing the broadest concept among the constituent elements in the embodiments are described as selectable constituent elements. The respective contents are combinable with each other in all the embodiments.

First Embodiment

FIG. 1 is a block diagram showing an example of an overall configuration of an information processing system 100 in a first embodiment of the disclosure. The information processing system 100 determines whether a target person to be recognized is identical to a registered person having been registered in advance by using voice data and a face image. The target person is an example of the first person, and the registered person is an example of the second person. The information processing system 100 is applied to, for example, an entry and exist management system for managing entry and exit of a target person into and from a management area. Examples of the management area include a building, a residence, and an office. The application of the information processing system 100 is not limited to the example, and may be applicable to a personal authentication or identification system for authenticating or identifying a person by using voice data and a face image.

The information processing system 100 includes an information processing device 1, a camera 2, a microphone 3, and a display 4. The information processing device 1 includes a computer. The information processing device 1 includes a processor 11 and a memory 12. The processor 11 includes, for example, a central processing unit (CPU). The memory 12 includes a rewritable non-volatile storage device, e.g., a flash memory.

The processor 11 has a face feature amount calculation part 111, a face similarity calculation part 112, a first acquisition part 113, a voice feature amount calculation part 114, a voice similarity calculation part 115, a second acquisition part 116, an integrating part 117, a recognition part 118, and an output part 119. Each of the face feature amount calculation part 111 to the output part 119 may be realized, for example, when the processor 11 executes an information processing program, or may be established in the form of a dedicated hardware circuit, such as an ASIC.

The face feature amount calculation part 111 acquires a face image of a target person photographed by the camera 2, and calculates a face feature amount being a feature amount of the face of the target person from the acquired face image. The face image means an image showing the face of the target person. The face image includes digital image data in pixels of predetermined rows×predetermined columns. The face image may be a monochrome image or a color image having three color components R, G, B. The face feature amount is expressed by, for example, a vector indicating a feature of the face.

The face feature amount calculation part 111 may calculate the face feature amount by inputting the face image into a face identification model. Examples of the face identification model include a learned model which is created in advance through machine learning of a plurality of datasets each defining a face image as an explanatory variable and defining a face feature amount as an objective variable.

For instance, the face identification model is stored in the memory 12 in advance. However, this is just an example, and the face feature amount calculation part 111 may calculate a face feature amount by transmitting a face image to an external server that stores a face identification model and acquiring a face feature amount as a reply from the external server.

The face similarity calculation part 112 acquires a face feature amount of the registered person and calculates a face similarity indicating a similarity between the acquired face feature amount of the registered person and a face feature amount of the target person. The memory 12 stores the face feature amount of the registered person in advance, and thus, the face similarity calculation part 112 is only required to acquire the face feature amount of the registered person from the memory 12. The face feature amount of the registered person is calculated in advance by inputting the face image of the registered person into the face identification model. Therefore, the face feature amount of the registered person has the same dimension number as that of the face feature amount of the target person.

Here, the memory 12 may store face feature amounts of a plurality of registered persons and a plurality of personal IDs in association with each other. In this case, the face similarity calculation part 112 may calculate a face similarity between a face feature amount of the registered person associated with the personal ID input by the target person and the face feature amount of the target person. In this case, the target person may input the personal ID via an unillustrated manipulation device.

The face similarity may adopt any indicator as long as the indicator enables evaluation of the similarity between vectors. In the embodiment, the face similarity has a larger value as the face similarity about the registered person is closer to the face similarity about the target person. The face similarity has a value normalized within a predetermined range (e.g., from 0 to 100, 0 to 200, or the like). For instance, the face similarity is calculated by normalizing a Euclidean distance or a cosine similarity within a predetermined range in such a manner as to have a larger value as the face similarity about the target person and the face similarity about the registered person come closer to each other.

The first acquisition part 113 acquires the face similarity calculated by the face similarity calculation part 112.

The voice feature amount calculation part 114 acquires voice data of the target person collected by the microphone 3, and calculates a voice feature amount being a feature amount of the voice of the target person from the acquired voice data. Examples of the voice data include digital voice data acquired through A/D conversion of analog voice data of the target person collected by the microphone 3. The voice feature amount is expressed by a vector indicating a feature of the voice. Examples of the voice feature amount include an x-vector and an i-vector.

The voice feature amount calculation part 114 may calculate the voice feature amount by inputting voice data into a voice identification model. Examples of the voice identification model include a learned model which is created in advance through machine learning of a plurality of datasets each defining voice data as an explanatory variable and defining a voice feature amount as an objective variable.

The voice identification model is stored in the memory 12 in advance. However, this is just an example, and the voice feature amount calculation part 114 may calculate a voice feature amount by transmitting voice data to an external server that stores a voice identification model and acquiring a voice feature amount as a reply from the external server.

The voice similarity calculation part 115 acquires a voice feature amount of the registered person and calculates a voice similarity indicating a similarity between the acquired voice feature amount of the registered person and a voice feature amount of the target person. The memory 12 stores the voice feature amount of the registered person in advance, and thus, the voice similarity calculation part 115 is only required to acquire the voice feature amount of the registered person from the memory 12. The voice feature amount of the registered person is calculated in advance by inputting the voice data of the registered person into the voice identification model. Therefore, the voice feature amount of the registered person has the same dimension number as that of the voice feature amount of the target person.

Here, the memory 12 may store voice feature amounts of a plurality of registered persons and a plurality of personal IDs in association with each other. In this case, the voice similarity calculation part 115 may calculate a voice similarity between the voice feature amount of the registered person associated with the personal ID input by the target person via a manipulation device and the voice feature amount of the target person.

The second acquisition part 116 acquires the voice similarity calculated by the voice similarity calculation part 115 and inputs the voice similarity into the integrating part 117.

When the face similarity acquired by the first acquisition part 113 falls within an integrated range, the integrating part 117 calculates an integrated similarity by integrating the face similarity and the voice similarity and determines the integrated similarity as a final similarity. By contrast, when the face similarity acquired by the first acquisition part 113 is out of the integrated range, the face similarity acquired by the first acquisition part 113 is determined as a final similarity. The integrated range includes a threshold T1 which is used to determine whether the target person and the registered person are identical to each other, and is stored in the memory 12 in advance. A way of calculating the integrated similarity will be described later.

The recognition part 118 determines whether the target person and the registered person are identical to each other, that is, determines whether the target person is the person him/herself or an identical person, or another person by comparing the final similarity calculated by the integrating part 117 with the threshold T1. The threshold T1 is stored in the memory 12 in advance. For instance, the recognition part 118 determines that the target person and the registered person are identical to each other when the final similarity exceeds the threshold T1. By contrast, the recognition part 118 determines that the target person is different from the registered person when the final similarity is equal to or lower than the threshold T1.

The output part 119 generates determination result information indicating a determination result by the recognition part 118, and outputs the generated determination result information to the display 4.

The memory 12 stores the face identification model, the voice identification model, the integrated range, and the threshold T1.

The camera 2 is, for example, a photographing device located at an entrance and exit of the management area. The camera 2 captures a face image of a target person when an unillustrated human sensor detects the target person who is likely to enter the management area. Alternatively, the camera 2 captures a face image of a target person when the target person inputs a personal ID via an unillustrated manipulation device. The camera 2 inputs the captured face image into the processor 11. When the personal ID is input, the camera 2 may input, into the processor 11, the face image and the personal ID in association with each other.

The microphone 3 is, for example, a sound collecting device located at the entrance and exist of the management area. The microphone 3 collects voice data of a target person when an unillustrated human sensor detects the target person who is likely to enter the management area. Alternatively, the microphone 3 collects voice data of a target person when the target person inputs a personal ID via an unillustrated manipulation device. The microphone 3 inputs the collected voice data into the processor 11.

The display 4 is, for example, a display device located at the entrance and exit of the management area. The display 4 displays the determination result information output from the output part 119. The display 4 displays first determination result information indicating that the target person is the identical person when the recognition part 118 determines that the target person and the registered person are identical to each other. The display 4 displays second determination result information indicating that the target person is another person when the recognition part 118 determines that the target person is different from the registered person. The first determination result information may indicate permission of entry of the target person into the management area. The second determination result information may indicate refusal of entry of the target person into the management area.

Figure 2:
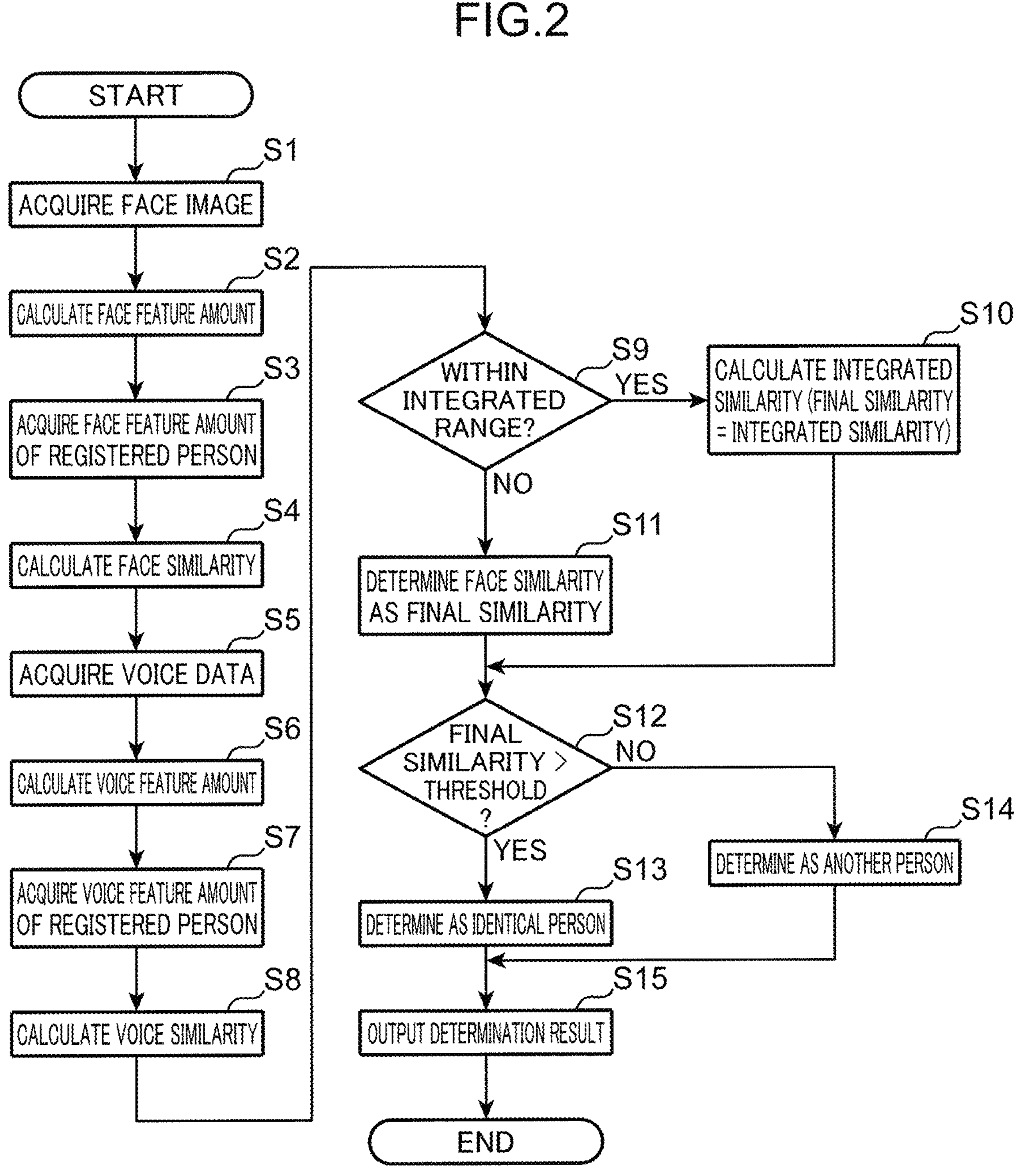
FIG. 2 is a flowchart showing an example of a process by an information processing device in the first embodiment.

Next, a process by the information processing device 1 will be described. FIG. 2 is a flowchart showing an example of the process by the information processing device 1 in the first embodiment.

Step S1

The face feature amount calculation part 111 acquires a face image of a target person from the camera 2.

Step S2

The face feature amount calculation part 111 calculates a face feature amount of the target person by inputting the face image into a face identification model.

Step S3

The face similarity calculation part 112 acquires a face feature amount of a registered person from the memory 12.

Step S4

The face similarity calculation part 112 calculates a face similarity indicating a similarity between the face feature amount of the target person calculated by the face feature amount calculation part 111 and the face feature amount of the registered person. The first acquisition part 113 acquires the face similarity calculated by the face similarity calculation part 112 and inputs the acquired face similarity into the integrating part 117.

Step S5

The voice feature amount calculation part 114 acquires voice data from the microphone 3.

Step S6

The voice feature amount calculation part 114 calculates a voice feature amount of the target person by inputting the voice data into a voice identification model.

Step S7

The voice similarity calculation part 115 acquires a voice feature amount of the registered person from the memory 12.

Step S8

The voice similarity calculation part 115 calculates a voice similarity indicating a similarity between the voice feature amount of the target person calculated by the voice feature amount calculation part 114 and the voice feature amount of the registered person. The second acquisition part 116 acquires the voice similarity calculated by the voice similarity calculation part 115 and inputs the acquired voice similarity into the integrating part 117.

Step S9

The integrating part 117 determines whether the face similarity input from the first acquisition part 113 falls within an integrated range. When the face similarity is determined to fall within the integrated range (YES in step S9), the process proceeds to step S10. By contrast, when the face similarity is determined to be out of the integrated range (NO in step S9), the process proceeds to step S11.

Step S10

The integrating part 117 calculates an integrated similarity by integrating the face similarity and the voice similarity, and determines the integrated similarity as a final similarity. The integrated similarity is calculatable by, for example, three ways to be described below. After finish of step S10, the process proceeds to step S12.

First Way

The integrating part 117 calculates an integrated similarity by performing weighted mean to a face similarity and a voice similarity by a fixed weighting factor. Specifically, the integrating part 117 calculates the integrated similarity by using the following Equation (1).

$$s = \alpha \cdot sv + (1 - \alpha) \cdot sf \tag{1}$$

The sign "s" denotes an integrated similarity. The sign "α" denotes a fixed weighting factor ranging from 0 to 1. The sign "sv" denotes a voice feature amount. The sign "sf" denotes a face feature amount.

Second Way

The integrating part 117 calculates an integrated similarity by performing weighted mean to a face similarity and a voice similarity by a variable weighting factor. Specifically, the integrating part 117 calculates the integrated similarity by using the following Equation (2)

$$s = \alpha \cdot sv + (1 - \alpha) \cdot sf \tag{2}$$

The weighting factor α has values that increase a ratio of a voice similarity sv to a face similarity sf as the face similarity sf comes closer to the center of an integrated range.

Figure 3:
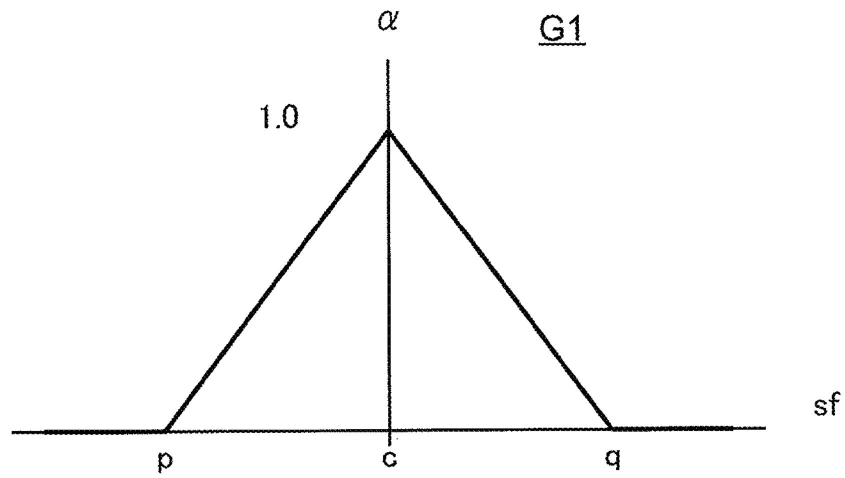
FIG. 3 is a graph showing a relation between a weighting factor and a face similarity.

FIG. 3 is a graph G1 showing a relation between the weighting factor α and the face similarity sf. In the graph G1, the vertical axis denotes a weighting factor α and the vertical axis denotes a face similarity sf. The sign "p" denotes a minimum of the integrated range and the sign "q" shows a maximum of the integrated range. The sign "c" denotes the center of the integrated range and is expressed by "c=(p+q)/2.

In consideration of the foregoing, the weighting factor α is expressible by the following Equations (3), (4).

$$\alpha = (sf - p)/(c - p) \ (sf \le c) \tag{3}$$

$$\alpha = (q - sf)/(q - c) \ (c < sf) \tag{4}$$

When the face similarity sf is equal to or lower than the center c, the weighting factor α linearly increases as the face similarity sf comes closer to the center c as shown in Equation (3). By contrast, when the face similarity sf is higher than the center c, the weighting factor α linearly decreases as the face similarity sf leaves farther away from the center c as shown in Equation (4). When the face similarity sf is at the center c, the weighting factor α indicates "1" as shown in Equation (3) or Equation (4).

In this manner, the second way sets the weighting factor α in such a manner as to come closer to "1" as the face similarity sf comes closer to the center c. Hence, the weighted mean is performed by the weighting factor indicating the linear change in the face similarity sf and the voice similarity sv so that the ratio of the voice similarity sv to the face similarity sf is larger as the face similarity sf comes closer to the center c. By contrast, the weighting factor α is set to come closer to zero or 0 as the face similarity sf leaves farther away from the center c. The weighted mean is thus performed by the weighting factor indicating the linear change in the face similarity sf and the voice similarity sv so that the ratio of the voice similarity sv to the face similarity sf is smaller as the face similarity sf comes closer to the minimum p or the maximum q from the center c.

Third Way

The integrating part 117 calculates a sum of a value obtained by multiplying a voice similarity sv by a weighting factor α and a face similarity sf as an integrated similarity. Specifically, the integrating part 117 calculates the integrated similarity by using the following Equation (5).

$$s = \alpha \cdot sv + sf \tag{5}$$

The sign "α" denotes a fixed weighting factor ranging from 0 to 1. The third way calculates, as the integrated similarity s, a sum obtained by adding the voice similarity sv weighted by the weighting factor α to the face similarity sf. This leads to a success in an accurate calculation of the integrated similarity based on the face similarity.

Step S11

The integrating part 117 determines the face similarity calculated by the face similarity calculation part 112 as a final similarity.

Step S12

The recognition part 118 determines whether the final similarity is higher than a threshold T1. When the final similarity is higher than the threshold T1 (YES in step S12), the process proceeds to step S13. By contrast, when the final similarity is equal to or lower than the threshold T1 (NO in step S12), the process proceeds to step S14.

Step S13

The recognition part 118 determines that the target person is identical to the registered person, that is, determines the target person as an identical person.

Step S14

The recognition part 118 determines that the target person is different from the registered person, that is, determines the target person as another person.

Step S15

The output part 119 generates determination result information indicating a determination result by the recognition part 118, and outputs the generated determination result information to the display 4. In this way, the display 4 displays first determination result information indicating that the target person is determined as the identical person or second determination result information indicating that the target person is determined as another person. This results in allowing the target person to be notified of the determination result.

When the target person is determined as the identical person, the information processing device 1 may transmit, to an automatic door at the entrance and exist of the management area, a control signal for opening the automatic door. By contrast, when the target person is not determined as the identical person, the information processing device 1 may avoid transmitting, to the automatic door, the control signal for opening the automatic door.

Figure 4:
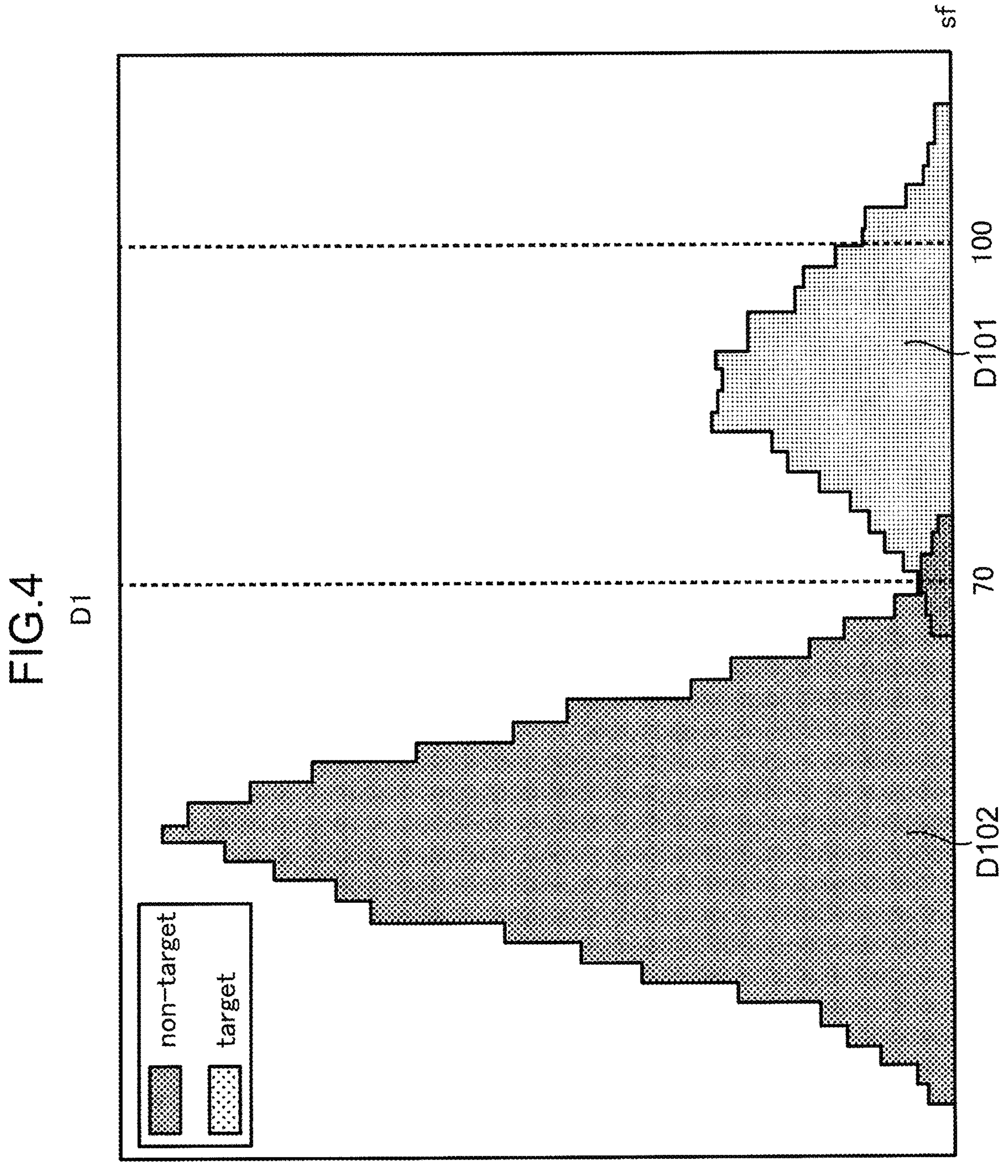
FIG. 4 is a graph explaining a drawback in a comparative example.

Subsequently, an effect by the information processing device 1 will be described in comparison with a comparative example. FIG. 4 is a graph explaining a drawback in the comparative example. FIG. 4 shows distribution information D1 with a vertical axis denoting a frequency and a horizontal axis denoting a face similarity sf. The distribution information D1 includes a first distribution D101 and a second distribution D102. The first distribution D101 represents an estimated distribution of the face similarity sf estimated to be obtained in trials of comparing face feature amounts of a target person with face feature amounts of a registered person when the target person is identical to the registered person. The second distribution D102 represents an estimated distribution of the face similarity sf estimated to be obtained in trials of comparing face feature amounts of the target person and face feature amounts of the registered person when the target person is different from the registered person. The first distribution D101 shows a distribution at a higher face similarity sf than that in the second distribution D102. A part of the left end of the first distribution D101 overlaps a part of the right end of the second distribution D102. The example adopts, as the threshold T1, a value (=70) of the face similarity sf at the center of the overlapping region.

In the comparative example, the integrated similarity s is compared with the threshold T1 (=70) regardless of whether the face similarity sf falls within the integrated range or not. In the comparative example, the integrated similarity s is calculated by "s=(sf+sv)/2."

Here, a case with the face similarity sf of 100 and the voice similarity sv of 20 will be discussed. In this case, the face similarity sf indicates 100 that is much higher than the threshold T1 (=70). Thus, the target person is highly likely to be the identical person.

However, in the comparative example, the integrated similarity s is calculated as 60 (=(100+20)/2), and the integrated similarity falls below the threshold T1 (=70). Accordingly, the target person is not determined as the identical person. As aforementioned, in the comparative example, only the integrated similarity s is used to determine whether the target person is the identical person or not. Under the circumstances, when a lower voice similarity sv is acquired even in a case of easy determination based on the face similarity sf, an erroneous determination may be made. The low voice similarity sv is acquired when a noise in an environment around the microphone 3 is large or the target person utters in a direction different from the direction in which the microphone 3 is located. The use of the voice similarity sv in such a situation may rather decrease the recognition accuracy.

The information processing device 1 calculates an integrated similarity in a case where the face similarity sf falls within the integrated range and it is difficult to determine whether the target person is the identical person only with the face similarity sf.

Figure 5:
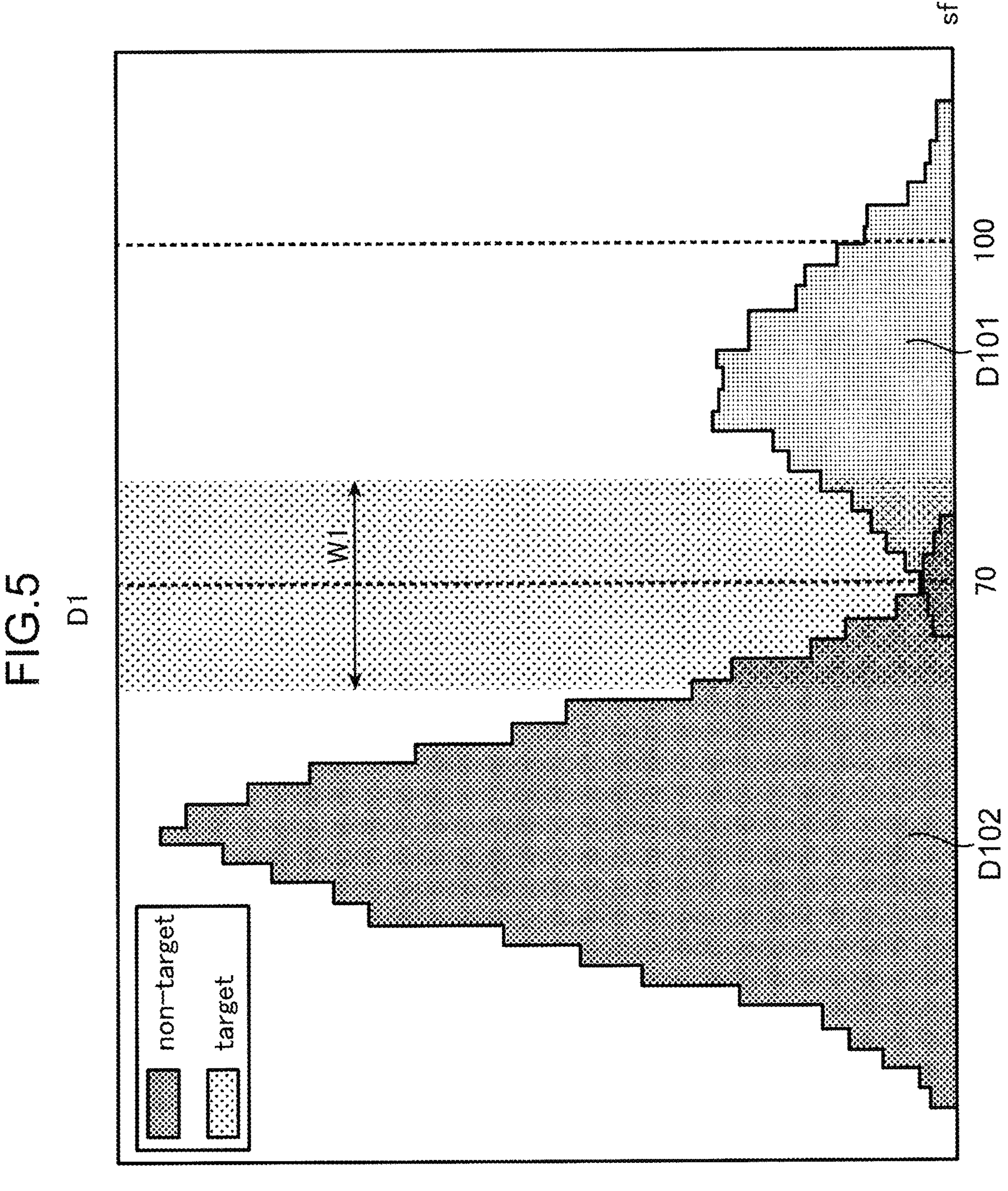
FIG. 5 is a graph explaining an effect by the information processing device in the first embodiment.

FIG. 5 is a graph explaining an effect by the information processing device 1 in the first embodiment. Distribution information D1 shown in FIG. 5 is same as the information in FIG. 4. FIG. 5 shows an example of an integrated range W1 in which the face similarity sf has a value ranging from 60 to 80. Here, a case with the face similarity sf of 100 and the voice similarity sv of 20 will be discussed. In this case, in the first embodiment, the face similarity sf indicates 100 which is out of the integrated range W1, and thus, the face similarity sf is determined as a final similarity. Hence, the final similarity exceeds the threshold T1 and the target person is determined as the identical person.

By contrast, in the embodiment, the integrated similarity s is calculated as a final similarity in a case where the face similarity sf falls within the integrated range W1 and it is difficult to make the determination only with the face similarity sf. In this way, the first embodiment attains a higher accuracy of determining whether the target person is the identical person.

FIG. 6 is a table showing experimental results of the information processing device 1 in the first embodiment and the comparative example. An equal error rate (EER, %) represents an evaluation criterion for an error rate which is generally used in identification of an utterer, and a smaller value thereof indicates higher performance. The word "minC" means a cost defined by the National Institute of Standards and Technology (NIST) in the US, and a smaller value thereof indicates higher performance.

As shown in FIG. 6, the EER (%) indicates "0.381" in the first embodiment while indicating "0.406" in the comparative example. Besides, the minC indicates "0.012" in the first embodiment while indicating "0.021" in the comparative example. It is confirmed from these perspectives that the way in the first embodiment shows higher performance in both the EER (%) and the minC than the way in the comparative example.

Conclusively, the first embodiment enables recognition of a target person by using an integrated similarity integrating a face similarity and a voice similarity when the face similarity is around a threshold and it is difficult to make a determination only with the face similarity. By contrast, use of only the face similarity leads to a success in recognizing the target person when the face similarity is not around the threshold and the determination only with the face similarity is easy. This results in attaining recognition of the target person with a high accuracy regardless of an accuracy of voice data.

Second Embodiment

A second embodiment aims at calculating an integrated range on the basis of distribution information. FIG. 7 is a diagram showing an example of an overall configuration of an information processing system 100 in the second embodiment of the disclosure. FIG. 7 differs from FIG. 1 in that a processor 11A in an information processing device 1A further includes an integrated range determination part 120. In the second embodiment, constituent elements which are the same as those in the first embodiment are given the same reference numerals and signs, and thus explanation therefor will be omitted.

The integrated range determination part 120 acquires distribution information including a first distribution indicating a relation between a face similarity and a frequency of the face similarity about an identical person, and a second distribution indicating a relation between a face similarity and a frequency of the face similarity in a different person. The integrated range determination part 120 calculates an integrated range on the basis of the first distribution and the second distribution, and stores the calculated integrated range in a memory 12.

Figure 8:
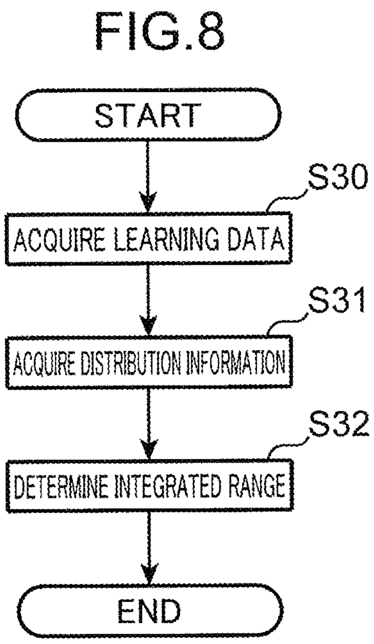
FIG. 8 is a flowchart showing an example of a process of determining an integrated range by an information processing device in the second embodiment of the disclosure.

FIG. 8 is a flowchart showing an example of a process of determining an integrated range by the information processing device 1A in the second embodiment of the disclosure.

Step S30

The integrated range determination part 120 acquires learning data for determining an integrated range. The integrated range determination part 120 may acquire learning data from an external terminal (not shown). Examples of the external terminal include a desktop computer.

The learning data includes first learning data and second learning data. The first learning data includes face similarities to be obtained in trials of comparing face feature amounts of a target person with face feature amounts of a registered person when the target person and the registered person are identical to each other. In each trial, there may be a plurality of target persons or a single target person. The second learning data includes face similarities to be obtained in trials of comparing face feature amounts of a target person with face feature amounts of a registered person when the target person and the registered person are different from each other.

Step S31

The integrated range determination part 120 calculates distribution information from the acquired learning data. In this manner, the integrated range determination part 120 acquires the distribution information. Here, the integrated range determination part 120 classifies the face feature amounts included in the first learning data into a plurality of classes and obtains a frequency of a face feature amount in each class to calculate the first distribution. The integrated range determination part 120 further classifies the face feature amounts included in the second learning data into a plurality of classes and obtains a frequency of a face feature amount in each class to calculate the second distribution. Consequently, the distribution information is calculated.

Step S32

The integrated range determination part 120 determines an integrated range on the basis of the first distribution and the second distribution. The integrated range is determinable by using three ways to be described below.

First Determination Way

Figure 9:
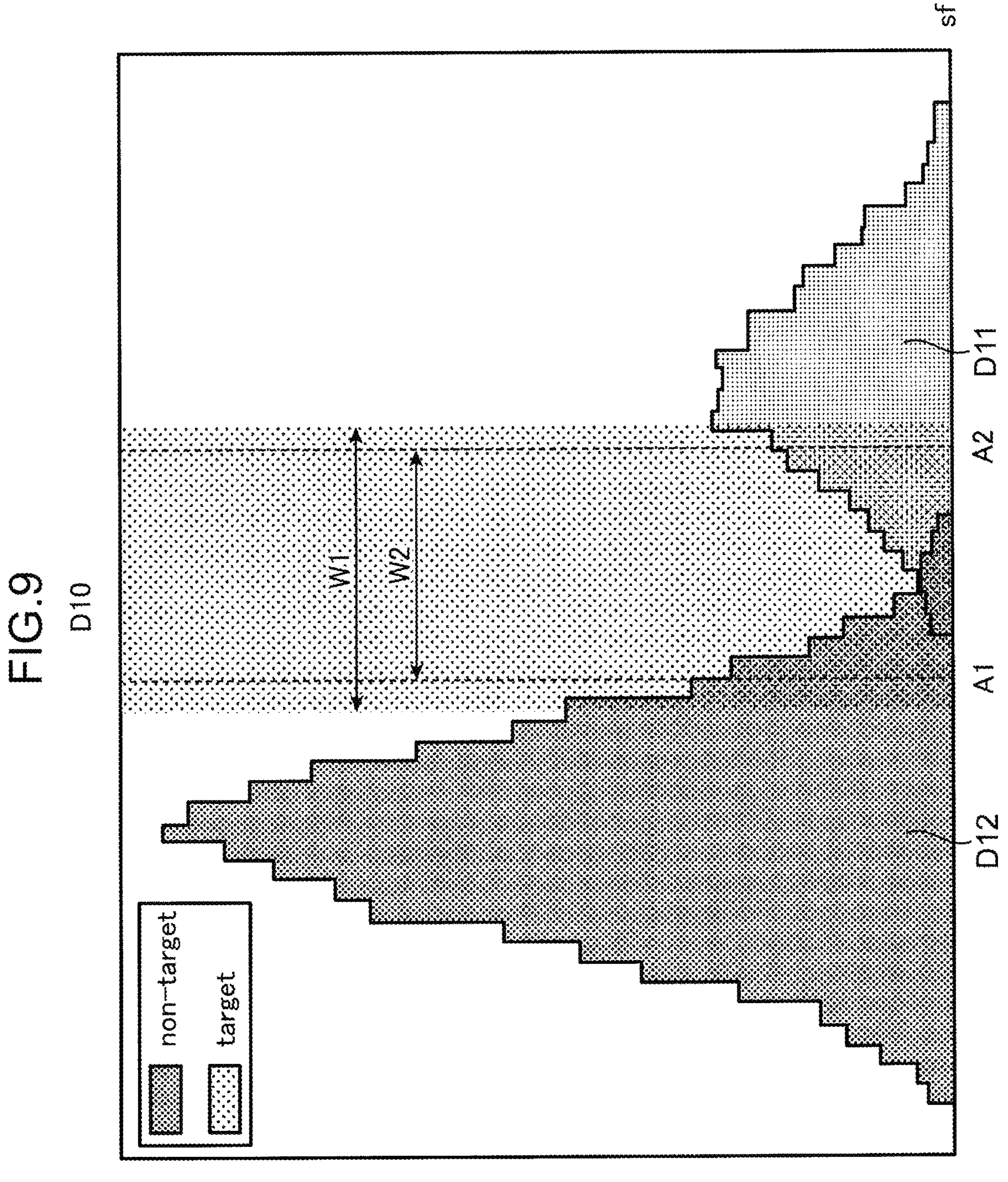
FIG. 9 is a graph for explaining a first determination way for the integrated range.

FIG. 9 is a graph for explaining a first determination way for the integrated range W1. Distribution information D10 shown in FIG. 9 includes a first distribution D11 and a second distribution D12. The distribution information D10 is shown with a vertical axis denoting a frequency and a horizontal axis denoting a face similarity sf. The first distribution D11 shows a distribution at a higher face similarity sf than that in the second distribution D12. A part of the left end of the first distribution D11 overlaps a part of the right end of the second distribution D12. A threshold T1 adopts, for example, a value of a face similarity sf at the center of the overlapping region.

The integrated range determination part 120 determines the integrated range W1 on the basis of a width W2 from a minimum A1 in the face similarity sf in the first distribution D11 to a maximum A2 in the face similarity sf in the second distribution D12.

Specifically, the integrated range determination part 120 calculates a dimension of the integrated range W1 by multiplying the width W2 by a predetermined coefficient (e.g., 1.1) to give a margin to the width W2. The integrated range determination part 120 further determines the position of the integrated range W1 in such a manner that the center of the integrated range W1 meets the center of the width W2. Here, the coefficient 1.1 is an example, and another value of 1.05, 1.15, or other appropriate value is adoptable.

Second Determination Way

Figure 10:
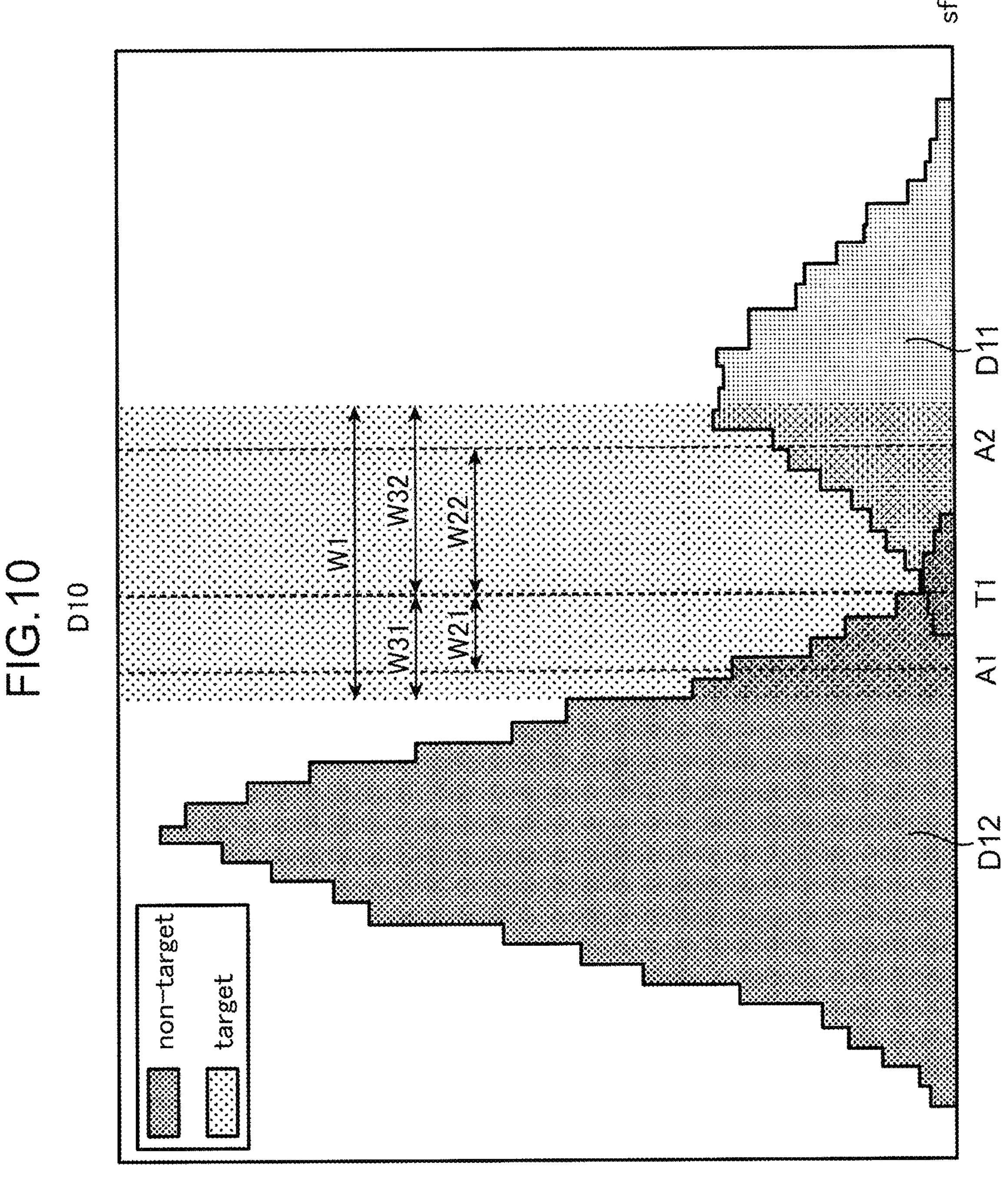
FIG. 10 is a graph for explaining a second determination way for the integrated range.

FIG. 10 is a graph for explaining a second determination way for the integrated range W1. The integrated range determination part 120 determines an integrated range W1 on the basis of a first width W21 from a threshold T1 to a minimum A1 in the face similarity sf in a first distribution D11 and a second width W22 from the threshold T1 to a maximum A2 in the face similarity sf in a second distribution D12.

Specifically, the integrated range determination part 120 calculates a first width W31 by multiplying the first width W21 by a predetermined coefficient (e.g., 1.1) to give a margin, and calculates a second width W32 by multiplying the second width W22 by a predetermined coefficient (e.g., 1.1) to give a margin. The integrated range determination part 120 calculates the integrated range W1 by connecting the first width W31 and the second width W32 to each other. Here, the coefficient 1.1 is an example, and another value of 1.05, 1.15, or other appropriate value is adoptable.

Third Determination Way

Figure 11:
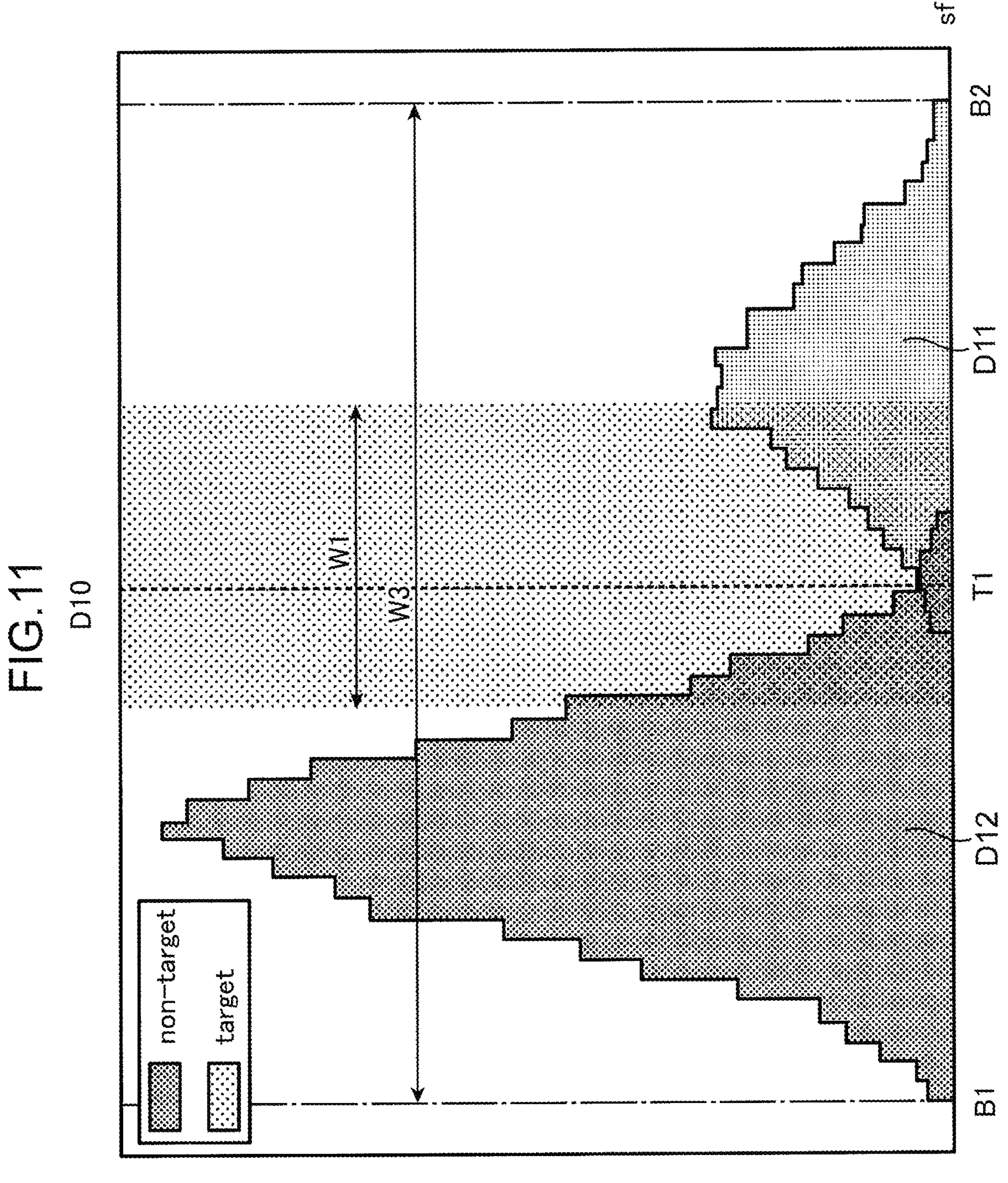
FIG. 11 is a graph for explaining a third determination way for the integrated range.

FIG. 11 is a graph for explaining a third determination way for the integrated range W1. The integrated range determination part 120 determines a width of the integrated range W1 on the basis of a third width W3 from a minimum B1 in the face similarity sf to a maximum B2 in the face similarity sf and an accuracy of the distribution information in a first distribution D11 and a second distribution D12.

The accuracy of the distribution information D10 has, for example, an average value of a correct rate in the first distribution D11 and a correct rate in the second distribution D12. The correct rate in the first distribution D11 indicates, for example, a ratio of the number of trials having the threshold T1 or higher in the first distribution D11 to total trials forming the first distribution D11. The correct rate in the second distribution D12 indicates, for example, a ratio of the number of trials having the threshold T1 or lower in the second distribution D12 to total trials forming the second distribution D12. The correct rate in the first distribution D11 may indicate, for example, a ratio of an area of a region having the threshold T1 or higher in the first distribution D11 to an area of a whole region forming the first distribution D11. The correct rate in the second distribution D12 may indicate, for example, a ratio of an area of a region having the threshold T1 or lower in the second distribution D12 to an area of a whole region forming the second distribution D12.

The accuracy of the distribution information D10 may have, for example, an average value of an error rate in the first distribution D11 and an error rate in the second distribution D12. The error rate in the first distribution D11 indicates, for example, a ratio of the number of trials having the threshold T1 or lower in the first distribution D11 to total trials forming the first distribution D11. The error rate in the second distribution D12 indicates, for example, a ratio of the number of trials having the threshold T1 or higher in the second distribution D12 to total trials forming the second distribution D12. The error rate in the first distribution D11 may indicate, for example, a ratio of an area of a region having the threshold T1 or lower in the first distribution D11 to an area of a whole region forming the first distribution D11. The error rate in the second distribution D12 may indicate, for example, a ratio of an area of a region having the threshold T1 or higher in the second distribution D12 to an area of a whole region forming the second distribution D12.

The integrated range determination part 120 may determine a width of the integrated range W1 by decreasing the width W3 as the accuracy of the distribution information D10 increases. The integrated range determination part 120 may further determine a position of the integrated range W1 in such a manner that the center of the integrated range W1 meets the threshold T1.

The integrating part 117 may determine whether to calculate the integrated similarity by comparing the integrated range W1 determined in this manner with the face similarity sf.

Conclusively, the second embodiment mekes a determination of an integrated range on the basis of distribution information calculated on the basis of an actual matter, and thus enables accurate determination of the integrated range.

Third Embodiment

Figure 12:
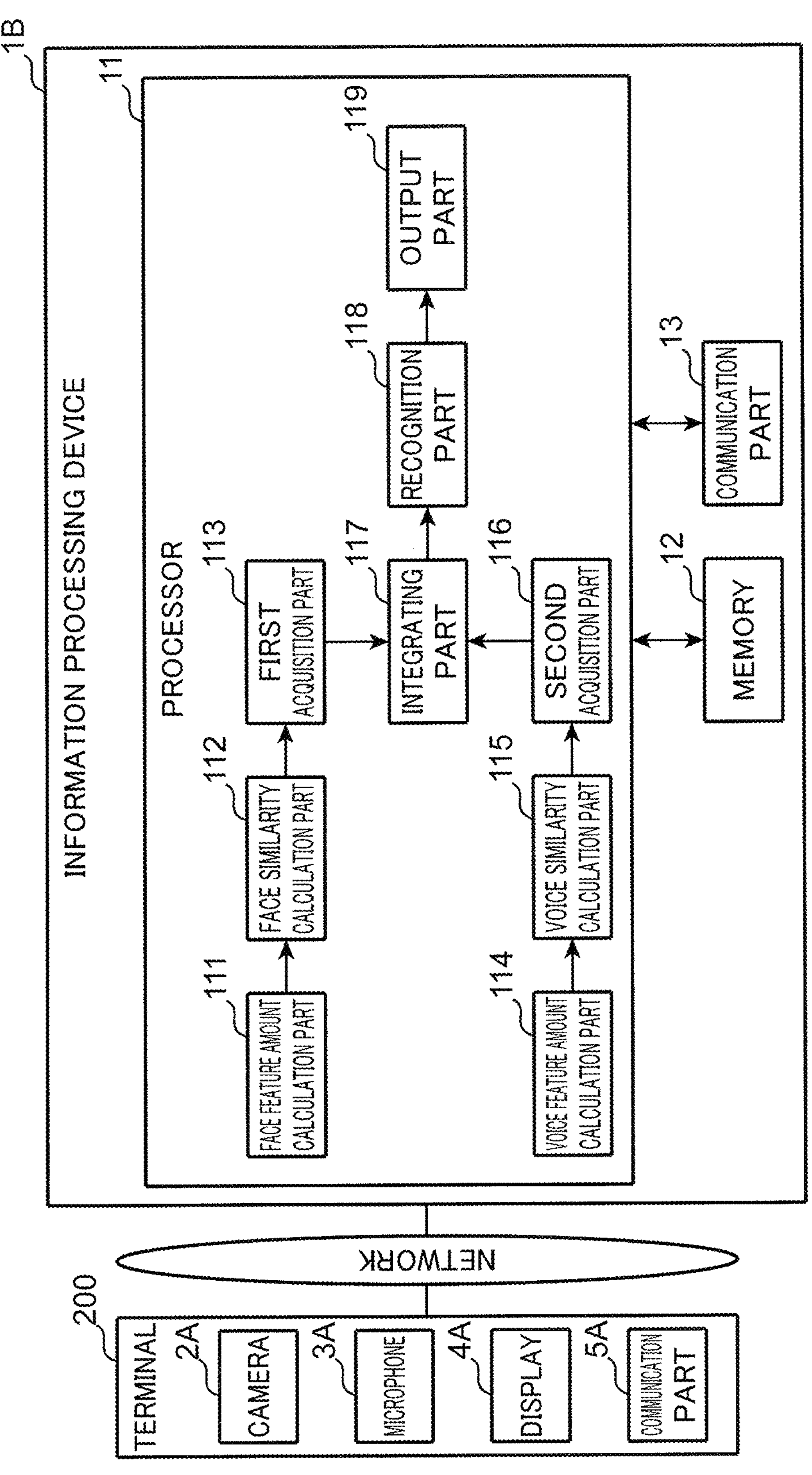
FIG. 12 is a diagram showing an example of an overall configuration of an information processing system in a third embodiment of the disclosure.

A third embodiment applies the information processing system 100 in the first embodiment for a network. FIG. 12 is a diagram showing an example of an overall configuration of an information processing system 100 in the third embodiment of the disclosure.

The information processing system 100 includes an information processing device 1B and a terminal 200. The information processing device 1B and the terminal 200 are communicably connected to each other via the network. The network includes, for example, a wide area communication network like the internet.

The information processing device 1B includes, for example, a cloud server including one or more computers, and additionally includes a communication part 13 in comparison with the information processing device 1. The communication part 13 is a communication device which connects the information processing device 1B to the network. The communication part 13 receives a face image and voice data transmitted from the terminal 200. The communication part 13 transmits, to the terminal 200, determination result information indicating a determination result by a recognition part 118.

The terminal 200 may include, for example, a tablet-type computer or a mobile terminal, such as a smart phone, or a desktop computer. The terminal 200 further includes a communication part 5A in addition to a camera 2A, a microphone 3A, and a display 4A. The camera 2A captures a face image of a target person. The microphone 3A collects voice data of the target person. The display 4A displays the determination result information. The communication part 5A transmits, to the information processing device 1B, the face image captured by the camera 2A and the voice data collected by the microphone 3A. The communication part 5A receives the determination result information transmitted from the information processing device 1B.

The information processing system 100 in the third embodiment determines whether a target person is the person him/herself or an identical person by using the terminal 200. When the target person utters toward the terminal 200, the camera 2A captures a face image of the target person and the microphone 3A collects voice data of the utterance. Then, the captured face image and the collected voice data are transmitted from the terminal 200 to the information processing device 1B. The information processing device 1B having received the face image and the voice data determines whether the target person is the identical person by using the way described in the first embodiment, and transmits, to the terminal 200, determination result information indicating a determination result as to whether the target person is the identical person. The terminal 200 having received the determination result displays the determination result information on the display 4A. This results in achieving presentation of the determination result to the target person.

This disclosure can adopt modifications described below.

(1) Although the integrated range determination part 120 is described to calculate distribution information on the basis of learning data acquired from an external terminal (not shown) in the second embodiment, this disclosure is not limited thereto. The integrated range determination part 120 may acquire the distribution information from the external terminal (not shown).

(2) The third embodiment may adopt the information processing device 1A shown in the second embodiment.

(3) Concerning each of the information processing devices 1, 1A, and 1B, an external device may be provided with the face feature amount calculation part 111, the face similarity calculation part 112, the voice feature amount calculation part 114, and the voice similarity calculation part 115. Examples of the external device may include the terminal 200. In this case, the first acquisition part 113 acquires a face similarity from the external device, and the second acquisition part 116 acquires a voice similarity from the external device.

(4) Concerning each of the information processing devices 1, 1A, and 1B, an external device (not shown) may be provided with the recognition part 118. In this case, the output part 119 may transmit a final similarity calculated by the integrating part 117 to the external device. Further, in this case, the recognition part 118 in the external device may determine whether a target person is an identical person by comparing the final similarity with a threshold.

(5) The camera 2 may input a face image into the information processing device 1 in a predetermined cycle. The microphone 3 may input voice data into the information processing device 1 in a predetermined cycle. In this case, the information processing device 1 may periodically determine whether a target person is an identical person.

(6) In FIG. 2, the set of steps from step S1 to S4 and the set of steps from step S5 to S8 may be executed in parallel.

INDUSTRIAL APPLICABILITY

This disclosure is useful in the technical field of identifying whether a person is the person him/herself, i.e., an identical person.

The invention claimed is:

1. An information processing method by a computer, comprising:

acquiring a face similarity indicating a similarity between a face of a first person and a face of a second person;

acquiring a voice similarity indicating a similarity between a voice of the first person and a voice of the second person;

calculating an integrated similarity by integrating the face similarity and the voice similarity, and determining the integrated similarity as a final similarity when the face similarity falls within an integrated range including a threshold which is used to determine whether the first person and the second person are identical to each other, and calculating the face similarity as a final similarity when the face similarity is out of the integrated range; and outputting the final similarity.

2. The information processing method according to claim 1, further comprising acquiring distribution information including a first distribution indicating a relation between a face similarity and a frequency of the face similarity about an identical person, and a second distribution indicating a relation between a face similarity and a frequency of the face similarity in a different person, wherein the integrated range is calculated on the basis of the first distribution and the second distribution.

3. The information processing method according to claim 2, wherein the integrated range is determined on the basis of a width from a minimum in the face similarity in the first distribution to a maximum in the face similarity in the second distribution.

4. The information processing method according to claim 2, wherein the integrated range is determined on the basis of a first width from the threshold to a minimum in the face similarity in the first distribution and a second width from the threshold to a maximum in the face similarity in the second distribution.

5. The information processing method according to claim 2, wherein the integrated range has a width including the threshold at the center thereof, the width being determined on the basis of a third width from a minimum in the face similarity to a maximum in the face similarity and an accuracy of the distribution information in the first distribution and the second distribution.

6. The information processing method according to claim 1, wherein the integrated similarity has a value obtained by performing weighted mean to the face similarity and the voice similarity by a predetermined weighting factor.

7. The information processing method according to claim 6, wherein the predetermined weighting factor has a fixed value.

8. The information processing method according to claim 6, wherein the predetermined weighting factor has values that increase a ratio of the voice similarity to the face similarity as the face similarity comes closer to the center of the integrated range.

9. The information processing method according to claim 1, wherein the integrated similarity is a sum of a value obtained by multiplying the voice similarity by a weighting factor and the face similarity.

10. The information processing method according to claim 1, further comprising:

acquiring a face image of the first person;

calculating a face feature amount of the first person from the face image of the first person;

acquiring a face feature amount of the second person; and calculating a face similarity from the face feature amount of the first person and the face feature amount of the second person, wherein, in the acquiring of the face similarity, the calculated face similarity is adopted.

11. The information processing method according to claim 1, further comprising:

acquiring voice data of the first person;

calculating a voice feature amount of the first person from the voice data of the first person;

acquiring a feature amount of the second person;

calculating a voice similarity from the voice feature amount of the first person and the voice feature amount of the second person, wherein, in the acquiring of the voice similarity, the calculated voice similarity is adopted.

12. The information processing method according to claim 1, further comprising:

determining that the first person and the second person are identical to each other when the final similarity exceeds the threshold, and determining that the first person and the second person are different from each other when the final similarity is smaller than the threshold; and outputting a result of the determination as to whether the first person and the second person are identical to each other or not.

13. An information processing device, comprising:

a first acquisition part that acquires a face similarity indicating a similarity between a face of a first person and a face of a second person;

a second acquisition part that acquires a voice similarity indicating a similarity between a voice of the first person and a voice of the second person;

an integrating part that calculates an integrated similarity by integrating the face similarity and the voice similarity, and determines the integrated similarity as a final similarity when the face similarity falls within an integrated range, and determines the face similarity as a final similarity when the face similarity is out of the integrated range; and an output part that outputs the final similarity.

14. A non-transitory computer readable recording medium storing a program, comprising:

causing a computer to execute:

acquiring a face similarity indicating a similarity between a face of a first person and a face of a second person;

acquiring a voice similarity indicating a similarity between a voice of the first person and a voice of the second person;

calculating an integrated similarity by integrating the face similarity and the voice similarity, and determining the integrated similarity as a final similarity when the face similarity falls within an integrated range, and calculating the face similarity as a final similarity when the face similarity is out of the integrated range; and outputting the final similarity.

* * * * *